United States Patent
Wilson et al.

(10) Patent No.: US 10,495,141 B2
(45) Date of Patent: Dec. 3, 2019

(54) BEARING WITH LIGHTWEIGHT BACKING SUBSTRATE

(71) Applicant: GM GLOBAL TECHNOLOGY OPERATIONS LLC, Detroit, MI (US)

(72) Inventors: Daniel J Wilson, Linden, MI (US); Jianghuai Yang, Rochester Hills, MI (US); James D Cremonesi, Rochester Hills, MI (US); Qigui Wang, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/655,002

(22) Filed: Jul. 20, 2017

(65) Prior Publication Data

US 2019/0024708 A1    Jan. 24, 2019

(51) Int. Cl.
*F16C 17/12* (2006.01)
*F16C 17/26* (2006.01)
(Continued)

(52) U.S. Cl.
CPC .............. *F16C 17/12* (2013.01); *C22C 21/00* (2013.01); *F16C 17/26* (2013.01);
(Continued)

(58) Field of Classification Search
CPC .......... F16C 9/02; F16C 17/022; F16C 17/12; F16C 33/122; F16C 33/124; F16C 33/125;
(Continued)

(56) References Cited

U.S. PATENT DOCUMENTS 2,316,119 A * 4/1943 Bagley, Jr. ............ F16C 33/122
                                                                205/149
2,333,227 A * 11/1943 Bagley, Jr. .................... 205/149
(Continued)

FOREIGN PATENT DOCUMENTS

DE          10062876 C1 * 4/2002 ................ F16C 9/04
EP          1580445 A1 * 9/2005
(Continued)

OTHER PUBLICATIONS

Dmitri Kopeliovich, "Engine Bearing Materials," available at, http://kingbearings.com/files/Engine_Bearing_Materials.pdf.

*Primary Examiner* — Marcus Charles

(57) ABSTRACT

A bearing shell for an automotive propulsion system is provided, along with a crankshaft assembly and an engine having a bearing shell. The bearing shell comprises an inner layer having an inner layer thickness. The inner layer defines a bearing surface on an inner side. The bearing surface of the inner layer is configured to support and contact an oil film. The bearing shell also has an outer layer disposed around the inner layer and radially outward of the inner layer. The outer layer has an outer layer thickness that is greater than the inner layer thickness, the outer layer thickness being at least one millimeter. The outer layer is formed of an outer layer material comprising an aluminum alloy and/or a metal matrix composite material. The inner layer is formed of an inner layer material, wherein the outer layer material is stronger than the inner layer material.

8 Claims, 2 Drawing Sheets

(51) Int. Cl.
*F16C 33/12* (2006.01)
*C22C 21/00* (2006.01)
*F16C 33/10* (2006.01)
*B32B 15/01* (2006.01)
*C25D 3/44* (2006.01)
*F16C 17/02* (2006.01)
*F16C 9/02* (2006.01)

(52) U.S. Cl.
CPC ...... *F16C 33/1065* (2013.01); *F16C 33/1085* (2013.01); *F16C 33/124* (2013.01); *F16C 33/125* (2013.01); *B32B 15/016* (2013.01); *C25D 3/44* (2013.01); *F16C 9/02* (2013.01); *F16C 17/022* (2013.01); *F16C 2204/20* (2013.01); *F16C 2360/22* (2013.01)

(58) Field of Classification Search
CPC .. F16C 33/127; F16C 2204/20; F16C 33/046; F16C 33/10; F16C 9/045; B32B 15/20; B32B 15/016; C21C 21/00; C25D 3/44; C25D 5/44; C25D 7/10
USPC ......... 384/32, 129, 145, 276, 291, 294, 430, 384/912, 114; 428/650, 908.8, 926; 123/197.4, 198 DA, 195 R, 197.3
See application file for complete search history.

(56) References Cited

U.S. PATENT DOCUMENTS

| | | | | |
|---|---|---|---|---|
| 2,741,016 A * | 4/1956 | Roach | ................... | B32B 15/017 29/898.058 |
| 3,251,119 A * | 5/1966 | Kingsbury | .............. | F16C 17/10 164/95 |
| 4,591,536 A * | 5/1986 | Hodes | .................... | F16C 33/12 205/252 |
| 4,666,792 A * | 5/1987 | Bickle | .................... | F16C 33/04 384/913 |
| 4,836,695 A * | 6/1989 | Baureis | ................. | F16C 17/022 384/276 |
| 4,844,627 A * | 7/1989 | Speakman | ............ | F16C 23/045 384/208 |
| 5,601,371 A * | 2/1997 | Koroschetz | ............. | F16C 33/12 384/276 |
| 5,712,049 A * | 1/1998 | Huhn | ........................ | C25D 3/30 205/213 |
| 6,000,851 A * | 12/1999 | Cohen | ..................... | F16C 17/03 384/114 |
| 6,134,779 A * | 10/2000 | Walker | ................... | B21K 1/766 148/689 |
| 6,178,639 B1 * | 1/2001 | Lytwynec | .............. | B32B 15/012 29/898.047 |
| 6,267,508 B1 * | 7/2001 | Bank | ........................ | F16C 9/04 384/276 |
| 6,321,712 B1 * | 11/2001 | Havel | ....................... | F16C 9/02 123/197.4 |
| 8,771,838 B2 * | 7/2014 | Grooteboer | ............ | C22C 21/14 384/912 |
| 2003/0180172 A1 * | 9/2003 | Oda | ........................ | B22D 19/14 419/5 |
| 2004/0052438 A1 * | 3/2004 | Sugita | ....................... | F16C 3/06 384/430 |
| 2004/0228554 A1 * | 11/2004 | Fujita | ....................... | F16C 9/02 384/291 |
| 2006/0216539 A1 * | 9/2006 | Takayanagi | ............. | C22C 12/00 428/642 |
| 2008/0056631 A1 * | 3/2008 | Beausoleil | ................ | B22F 7/08 384/276 |
| 2011/0303183 A1 * | 12/2011 | Zottin | ....................... | F16C 9/04 123/197.3 |
| 2017/0241473 A1 | 8/2017 | Murrish et al. | | |

FOREIGN PATENT DOCUMENTS

| | | | | |
|---|---|---|---|---|
| JP | 62180117 A | * | 8/1987 | ............. F16C 33/20 |
| JP | 2000027868 A | * | 1/2000 | ............. F02F 7/0007 |
| JP | 2003322139 A | * | 11/2003 | ............. F16C 33/14 |
| JP | 2004076756 A | * | 3/2004 | ............. F16C 33/12 |
| JP | 4359409 B2 | * | 11/2009 | |

* cited by examiner

BEARING WITH LIGHTWEIGHT BACKING SUBSTRATE

TECHNICAL FIELD

The present teachings generally relate to a crankshaft assembly and, more specifically, bearing shells which may be used in a crankshaft assembly.

BACKGROUND

An engine crankshaft converts reciprocating linear movement of a piston into rotational movement about a longitudinal axis to provide torque to propel a vehicle, such as but not limited to a train, a boat, a plane, a truck, or an automobile.

The crankshaft includes at least one crankpin that is offset from the longitudinal axis, to which a reciprocating piston is attached via a connecting rod. Force applied from the piston to the crankshaft through the offset connection therebetween generates torque in the crankshaft, which rotates the crankshaft about the longitudinal axis. The crankshaft further includes at least one main bearing journal disposed concentrically about the longitudinal axis. The crankshaft is secured to an engine block at the main bearing journal(s). A bearing is disposed about the main bearing journal, between the crankshaft and the engine block. Additional bearings are disposed between the crankshaft and connecting rods.

These bearings are subject to high loads and an environment that eventually tends to cause corrosion and erosion. Accordingly, materials are carefully selected to provide strength while at the same time resisting corrosion and erosion. However, the result is that the bearing is heavier than desired.

SUMMARY

The present disclosure provides a bearing for use in a crankshaft assembly and an engine that provides high strength, corrosion resistance, and erosion resistance while achieving a mass savings. The bearing has a high-strength aluminum or metal matrix composite (MMC) backing layer with a corrosion and erosion resistant bearing layer.

In one form, which may be combined with or separate from the other forms disclosed herein, a bearing shell for an automotive propulsion system is provided. The bearing shell includes an inner layer having an inner layer thickness, where the inner layer defines a bearing surface on an inner side. The bearing surface of the inner layer is configured to support and contact an oil film. An outer layer is disposed around the inner layer and radially outward of the inner layer. The outer layer has an outer layer thickness that is greater than the inner layer thickness, the outer layer thickness being at least one millimeter. The outer layer is formed of an outer layer material comprising an aluminum alloy and/or a metal matrix composite material. The inner layer is formed of an inner layer material, wherein the outer layer material is stronger than the inner layer material. A bearing cap is configured to crush the outer layer of the bearing shell between the bearing cap and a portion of an engine block.

In another form, which may be combined with or separate from the other forms disclosed herein, a crankshaft assembly is provided. The crankshaft assembly includes a crankshaft configured to rotate due to movement of a piston within a cylinder bore by combustion. The crankshaft assembly also includes a bearing shell surrounding the crankshaft. The bearing shell includes an inner layer having an inner layer thickness, where the inner layer has a bearing surface on an inner side. The bearing surface of the inner layer is configured to support and contact an oil film, and the crankshaft is configured to rotate on the oil film. An outer layer is disposed around the inner layer and radially outward of the inner layer and the crankshaft. The outer layer has an outer layer thickness that is greater than the inner layer thickness, the outer layer thickness being at least one millimeter. The outer layer is formed of an outer layer material comprising an aluminum alloy and/or a metal matrix composite material. The inner layer is formed of an inner layer material, where the outer layer material is stronger than the inner layer material. A bearing cap is configured to crush the outer layer of the bearing shell between a bearing cap and a portion of the engine block.

In yet another form, which may be combined with or separate from the other forms disclosed herein, an engine is provided that is configured to power a motor vehicle. The engine includes an engine block defining a plurality of cylinder bores therein. A piston is disposed within and movable within each cylinder bore. A crankshaft is configured to be rotated by movement of each piston due to combustion. A bearing shell surrounds the crankshaft. The bearing shell includes an inner layer having an inner layer thickness and a bearing surface on an inner side. The bearing surface of the inner layer is configured to support and contact an oil film. The crankshaft is configured to rotate on the oil film. The bearing shell has an outer layer that is disposed around the inner layer and radially outward of the inner layer and the crankshaft. The outer layer has an outer layer thickness that is greater than the inner layer thickness, the outer layer thickness being at least one millimeter. The outer layer is formed of an outer layer material comprising an aluminum alloy and/or a metal matrix composite material. The inner layer is formed of an inner layer material, where the outer layer material is stronger than the inner layer material. A bearing cap is configured to crush the outer layer of the bearing shell between the bearing cap and a portion of the engine block.

Further additional features may be provided, including but not limited to the following: the inner layer being configured to support and allow rotation of a rod disposed inward of the inner layer; the inner layer being a bearing layer disposed in contact with an inner side of the outer layer; further comprising an intermediate bearing layer disposed between the outer layer and the inner layer; the inner layer being an overlay disposed radially inward of the intermediate bearing layer; wherein the intermediate bearing layer contacts both the outer layer and the overlay; wherein the outer side of the outer layer is configured to be crushed into a bore of at least one engine component; wherein the inner layer comprises copper, tin, aluminum, silicon, and/or a polymer; wherein an outer side of the outer layer forms the outermost edge of the bearing shell; and wherein the outer layer is substantially comprised of at least one of the following aluminum alloys: 2014-T6, 7075-T6, and 6066-T6, or an aluminum based MMC.

The above features and advantages and other features and advantages of the present teachings are readily apparent from the following detailed description of the best modes for carrying out the present teachings when taken in connection with the accompanying drawings.

BRIEF DESCRIPTION OF THE DRAWINGS

The drawings are provided for illustration purposes only and are not intended to limit this disclosure or its application or uses.

DETAILED DESCRIPTION

Those having ordinary skill in the art will recognize that terms such as "above," "below," "upward," "downward," "top," "bottom," "upper," "lower," etc., are used descriptively for the figures, and do not represent limitations on the scope of the invention, as defined by the appended claims.

Figure 1:
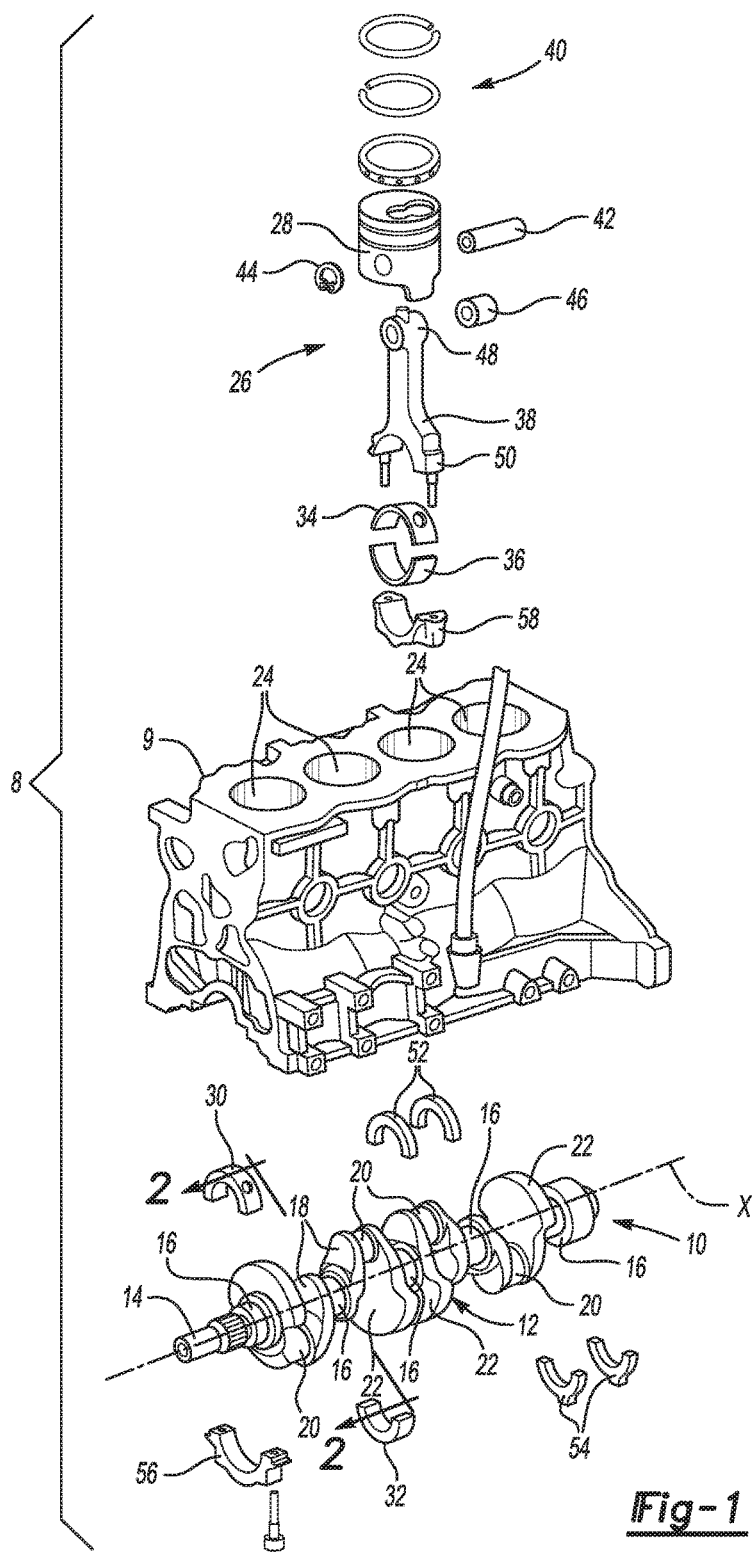
FIG. 1 is an exploded perspective view of an exemplary automotive engine having a crankshaft assembly including a plurality of bearing shells, in accordance with the principles of the present disclosure.

Referring to the Figures, wherein like numerals indicate like parts throughout the several views, FIG. 1 shows an exploded view of an automotive engine 8 having an engine block 9 and a crankshaft assembly 10 that includes a crankshaft 12. Some components of the engine 8, as are known in the art, have been eliminated from FIG. 1 for simplicity. The engine 8 may be a gasoline engine, as shown, or a diesel engine, a compressor, or any other similar device. The crankshaft 12 includes a shaft 14 extending along a longitudinal axis X that defines a plurality of main bearing journals 16, a plurality of arms 18, a plurality of pin bearing journals 20, and at least one counterweight 22. The arms 18 connect the pin bearing journals 20 to the main bearing journals 16 and the shaft 14.

The engine block 9 defines a plurality of cylinder bores 24 therein. The cylinder bores 24 support a plurality of piston assemblies 26 including pistons 28 and associated components as is known in the art, only one piston assembly 26 of which is shown in FIG. 1. Each piston 28 is disposed within and movable within a cylinder bore 24 of the plurality of cylinder bores 24, when assembled. The crankshaft 12 is configured to rotate to be moved by the pistons 28, which are moved within the bores 24 due to combustion, as is known in the art.

The main bearing journals 16 are disposed concentrically about the longitudinal axis X. Each of the pin bearing journals 20 is laterally offset from the longitudinal axis X, and is attached to the main bearing journals 16 by a pair of the arms 18. Each of the arms 18 extends from one of the main bearing journals 16 to one of the pin bearing journals 20, and may or may not include one of the counterweights 22. Each of the counterweights 22 extends radially away from the longitudinal axis X.

Each of the main bearing journals 16 supports a bearing shell having an upper bearing shell half 30 and a lower bearing half 32 thereabout, and provides an attachment location for attaching the crankshaft 12 to the engine block 9. Similarly, each of the pin bearing journals 20 supports a bearing shell having an upper bearing shell half 34 and a lower bearing shell half 36 thereabout, to which a connecting rod 38 of the piston assembly 26 is attached. The connecting rod 38 attaches a piston 28 to the crankshaft 12. The counterweights 22 offset the reciprocating mass of the pistons 28, piston rings 40, piston pins 42, retaining parts 44, 46, the small ends 48 of the connecting rods 38, the rotating mass of the connecting rod large ends 50, bearings 34, 36, and the rotating mass of the crankshaft itself 12. The main bearing journals 16 are located on the longitudinal axis X and do not require any counterweights 22. The counterweights 22 reduce the forces acting on the main bearing journals 16 and thereby improve the durability of the bearings 30, 32, 34, 36. The counterweights 22 balance the rotation of the crankshaft 12 about the longitudinal axis X to reduce vibration therein. Upper and lower thrust bearings 52, 54 may also be included, as is known in the art.

The engine 8 shown in FIG. 1 is an inline four cylinder engine, and includes four pin bearing journals 20 and five main bearing journals 16. However, it should be appreciated that the crankshaft assembly 10 may be configured differently than shown in FIG. 1. As such, the crankshaft assembly 10 may be configured for any style and/or configuration of engine, including but not limited to a V style engine (e.g., an engine having two banks of cylinders arranged in a V to form a valley therebetween) having six or eight cylinders, or an inline style of engine having 3, 5, 6 or some other number of cylinders. The crankshaft may be a shared-pin V crankshaft, which has two rods per crankpin journal such as a V8 or V12 engine. The crankshaft may be a V crankshaft with a "flying arm" in between the two rod journals. V6 engines have four main bearings and two rods between each main bearing. A 60-degree (bank angle between cylinders) V6 crankshaft has a thick flying arm between crankpins because there is a 60 degree pin splay, and a 90 degree V6 crank has a thinner flying arm (only a 30 degree pin splay in the end view). Furthermore, the crankshaft 12 may have any number of counterweights 22 attached to the various arms 18 in any configuration. For example, an in-line four cylinder crankshaft assembly 10 may include six or eight counterweights 22. Accordingly, the specific crankshaft assembly 10 shown in FIG. 1 is merely exemplary, and should not be considered as limiting the scope of the claims.

Figure 2:
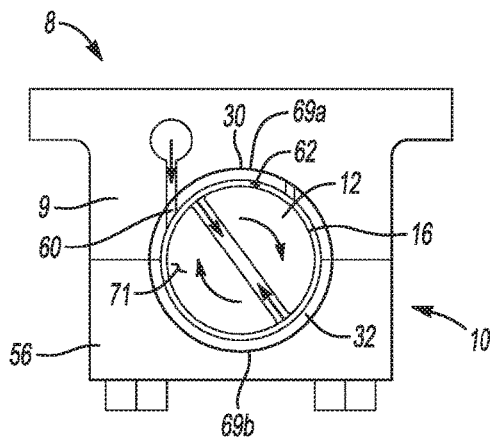
FIG. 2 is a cross-sectional view of the crankshaft assembly and bearing shells illustrated in FIG. 1 taken along the line 2-2 in FIG. 1, according to the principles of the present disclosure.

Referring now to FIG. 2, the crankshaft assembly 10 is shown assembled in place within the engine 8. The bearing shell includes upper and lower bearing shell halves 30, 32 surrounding the crankshaft 12, and specifically, the main bearing journals 16. Though not shown in an assembled view such as FIG. 2, the pin bearing shell halves 34, 36 similarly surround the pin bearing journals 20. A main bearing cap 56 crushes the main bearing shell halves 30, 32 between the engine block 9 and the main bearing cap 56. Similarly, a connecting rod cap 58 crushes the pin bearing shell halves 34, 36 between the connecting rod 38 and the connecting rod cap 58.

Figure 3:
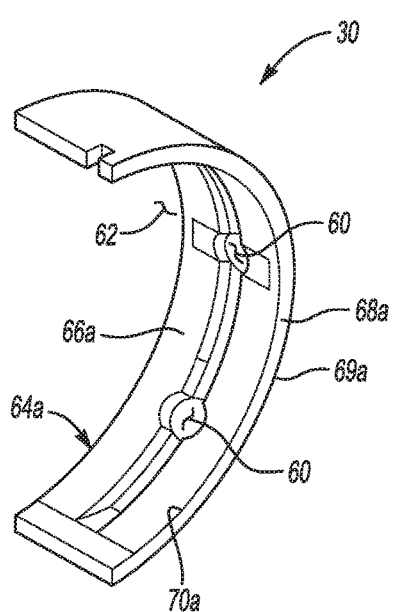
FIG. 3 is a perspective view of an upper bearing shell of the plurality of bearing shells illustrated in FIGS. 1-2, in accordance with the principles of the present disclosure.
Figure 4:
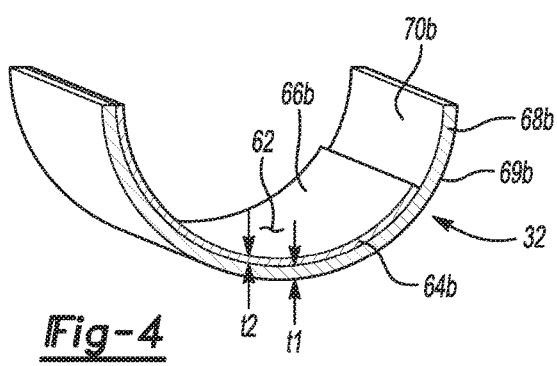
FIG. 4 is a perspective view of a first variation of a lower bearing shell of the plurality of bearing shells illustrated in FIGS. 1-2, in accordance with the principles of the present disclosure.

FIGS. 3 and 4 show the main bearing shell halves 30, 32 in greater detail. Though the main bearing shell halves 30, 32 are illustrated in FIGS. 3 and 4, it should be understood that construction illustrated may also apply to the pin bearing halves 34, 36. The upper bearing shell half 30 is illustrated in FIG. 3, and the lower bearing shell half 32 is illustrated in FIG. 4. The upper bearing shell half 30 may have one or more apertures 60 defined therethrough to allow oil to flow into an inner region 62 of the bearing shell halves 30, 32, the inner region being located between the bearing shell halves 30, 32 and the crankshaft 12.

Each of the upper and lower bearing shell halves 30, 32 includes an inner layer 64a, 64b that defines a bearing surface on the inner side 66a, 66b of the inner layer 64a,

64b. The bearing surface of the inner layer 64a, 64b is configured to support and contact an oil film. The crankshaft 12 rotates on the oil film, where the oil film may have a thickness of about 1 micrometer or less, by way of example. Thus, the inner layer 64a, 64b is configured to support and allow rotation of the crankshaft stem 14 disposed inward of the inner layer 64a, 64b.

An outer layer 68a, 68b is disposed around the inner layer 64a, 64b, the outer layer 68a, 68b being disposed radially outward of the inner layer 64a, 64b and the crankshaft 12. In FIG. 4, the inner layer 64b of the lower bearing shell half 32 is shown partially cut away from the outer layer 68b. The outer layer 68a, 68b provides strength to the bearing shell 30, 32 and has traditionally been formed of steel. The outer layer 68a, 68b of the bearing shell halves 30, 32, however, is formed of a high-strength aluminum alloy or a metal matrix composite. By way of example, the high-strength aluminum alloy used in the outer layer 68a, 68b may be substantially comprised of one or more of the following high-strength aluminum alloys: 2014-T6, 7075-T6, 7090-T6, 7091-T6, 7054-T6, and 6066-T6. Metal matrix composites may include, but are not limited to aluminum matrix composites (A356+Al2O3p (particles), A356+Al2O3w (whiskers), A356+SiCp, A356+graphites, A6061+Al2O3p, A6061+Al2O3w, A6061+SiCp, A6063+Al2O3p, A6063+Al2O3w, etc.); magnesium matrix composites (AZ91+SiCp; AZ91+TiCp; AZ91+B4Cp, AZ91+CNTs, etc). Other Aluminum Fiber-Reinforced MMC's may also include those reinforced with graphite (carbon), boron, silicon carbide, aluminia, titanium, and graphite/copper.

The outer layer 68a, 68b has a thickness t1 that is greater than a thickness t2 of the inner layer 64a, 64b. For example, the thickness t1 of the outer layer 68a, 68b may be at least one millimeter and may be in the range of about 2.5 mm to about 4.0 mm. The thickness t2 of the inner layer 64a, 64b may be in the range of about 0.2 mm to about 0.3 mm.

The inner layer 64a, 64b may be formed on any suitable bearing layer materials, such as copper, tin, aluminum, silicon, or polymeric materials. One or more of these materials may be used alone or in combination to form the inner layer 64a, 64b. The outer layer material is stronger than the inner layer material, in this example, as the outer layer 68a, 68b is configured to provide strength to the bearing shell 30, 32.

An outer side 69a, 69b of the outer layer 68a, 68b forms the outermost edge of the bearing shell 30, 32. The bearing cap 56 is configured to crush the outer side 69a, 69b of the outer layer 68a, 68b between the bearing cap 56 and a portion of the engine block 9. Thus, the outer side 69a, 69b of the outer layer 68a, 68b is crushed into a bore 71 defined between the cap 56 and the engine block 9 (shown in FIG. 2). In the illustrated example of FIGS. 3-4, the inner layer 64a, 64b is a bearing layer disposed in contact with an inner side 70a, 70b of the outer layer 68a, 68b.

Figure 5:
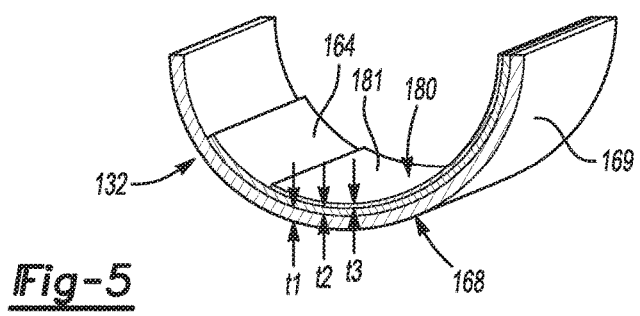
FIG. 5 is a perspective view of a second variation of a lower bearing shell of the plurality of bearing shells illustrated in FIGS. 1-2, in accordance with the principles of the present disclosure.

Referring now to FIG. 5, an alternative construction of the lower bearing shell half 32 is illustrated and generally designated with reference number 132. It should be understood that a similar construction could also be used for the upper bearing shell half 30, or either of the bearing shell halves 34, 36 for the connecting rods 38.

The bearing shell half 132 includes an outer layer 168 similar to the outer layers 68a, 68b described above. For example, the outer layer 168 provides strength to the bearing shell 132 and is formed of a high-strength aluminum alloy or a metal matrix composite. By way of example, the high-strength aluminum alloy used in the outer layer 168 may be substantially comprised of one or more of the following aluminum alloys: 2014-T6, 7075-T6, 7090-T6, 7091-T6, 7054-T6, and 6066-T6. An outer side 169 of the outer layer 168 forms the outermost edge of the bearing shell 132. The bearing cap 56 is configured to crush the outer side 169 of the outer layer 168 between the bearing cap 56 and a portion of the engine block 9. Thus, the outer side 169 of the outer layer 168 may be crushed into the bore 71 defined between the cap 56 and the engine block 9.

The outer layer 168 is disposed around and radially outward of an inner layer 180, which in this example is an overlay layer. The overlay layer may be constructed of, for example, tin, silver, copper, aluminum, and/or polymeric materials. In the example of FIG. 5, an intermediate bearing layer 164 is disposed between the outer layer 168 and the inner overlay layer 180. In this example, the intermediate bearing layer 164 contacts both the outer layer 168 and the overlay 180. In other variations, one or more additional layers could be disposed between the outer layer 168 and the overlay 180. In FIG. 5, the overlay 180 and the intermediate bearing layer 164 are shown partially cut away from the outer layer 168.

Similar to the inner layer 64a, 64b described above, the intermediate bearing layer 164 may be formed on any suitable bearing layer materials, such as copper, tin, aluminum, silicon, and polymeric materials. One or more of these materials may be used alone or in combination to form the intermediate bearing layer 164. The outer layer material is stronger than the intermediate bearing layer material and the overlay material in this example, as the outer layer 168 is configured to provide strength to the bearing shell 132.

The outer layer 168 has a thickness t1 that is greater than a thickness t2 of the intermediate bearing layer 164, and the intermediate bearing layer thickness t2 is greater than a thickness t3 of the overlay 180. For example, the thickness t2 of the outer layer 168 may be at least one millimeter and may be in the range of about 2.5 mm to about 4.0 mm. The intermediate bearing layer 164 may be in the range of about 0.2 mm to about 0.3 mm, and the thickness t3 of the overlay may be less than or equal to about 0.02 mm.

The inner overlay layer 180 defines a bearing surface on the inner side 181 of the inner overlay layer 180. The bearing surface of the inner overlay layer 180 is configured to support and contact an oil film. The crankshaft 12 rotates on the oil film, where the oil film may have a thickness of about 1 micrometer or less, by way of example. Thus, the overlay 180 is configured to support and allow rotation of the crankshaft rod 14 disposed inward of the inner overlay layer 180.

The thrust bearings 52, 54 may have a similar construction as the main bearing shells 30, 32, 132 or the pin bearing shells 34, 36, such as having an outer layer 68a, 68b and an inner layer 64a, 64b or an intermediate bearing layer 164 and an overlay 180.

The construction of the bearing shells 30, 32, 34, 36, 132, 52, 54 described herein may result in a weight savings and improved bonding between the outer layer and the inner layer or the intermediate bearing layer, as well as improved thermal compatibility and conductivity between the outer layer and the inner layer or the intermediate bearing layer, resulting in avoiding distortion and reducing bearing seizure and failure.

It will be apparent that modifications and variations are possible without departing from the scope of the invention defined in the appended claims. More specifically, although some aspects of the present disclosure are identified herein as preferred or particularly advantageous, it is contemplated that the present invention is not necessarily limited to these preferred aspects of the invention.

The invention claimed is:

1. A bearing shell for an automotive propulsion system, the bearing shell comprising:
   an inner layer having an inner layer thickness, the inner layer defining a bearing surface on an inner side, the bearing surface of the inner layer being configured to support and contact an oil film; and
   an outer layer disposed around the inner layer and radially outward of the inner layer, the outer layer having an outer layer thickness that is greater than the inner layer thickness, the outer layer thickness being at least one millimeter, the outer layer being formed of an outer layer material comprising at least one of an aluminum alloy and a metal matrix composite material, the inner layer being formed of an inner layer material, wherein the outer layer material is stronger than the inner layer material,
   wherein an outer side of the outer layer is configured to be crushed into a bore formed by at least one engine component, the outer side of the outer layer forming an outermost edge of the bearing shell and being configured to directly contact the engine component.

2. The bearing shell of claim 1, wherein the inner layer comprises at least one of the following materials: copper, tin, aluminum, silicon, and a polymer.

3. The bearing shell of claim 2, wherein the outer layer is substantially comprised of at least one of the following aluminum alloys: 2014-T6, 7075-T6, 7090-T6, 7091-T6, 7054-T6, and 6066-T6.

4. An engine configured to power a motor vehicle, the engine comprising:
   an engine block defining a plurality of cylinder bores therein;
   a plurality of pistons, each piston of the plurality of pistons being disposed within and movable within a cylinder bore of the plurality of cylinder bores;
   a crankshaft configured to be rotated by movement of each piston of the plurality of pistons upon combustion within the cylinder bores;
   a bearing shell surrounding the crankshaft, the bearing shell comprising:
      an inner layer having an inner layer thickness and a bearing surface on an inner side, the bearing surface of the inner layer being configured to support and contact an oil film, the crankshaft being configured to rotate on the oil film; and
      an outer layer disposed around the inner layer and radially outward of the inner layer and the crankshaft, the outer layer having an outer layer thickness that is greater than the inner layer thickness, the outer layer thickness being at least one millimeter, the outer layer being formed of an outer layer material comprising at least one of an aluminum alloy and a metal matrix composite material, the inner layer being formed of an inner layer material, the outer layer material being stronger than the inner layer material; and
   a bearing cap crushing the outer layer of the bearing shell between the bearing cap and a portion of the engine block, the bearing cap directly contacting the outer layer.

5. The engine of claim 4, the inner layer being a bearing layer disposed in contact with an inner side of the outer layer.

6. The engine of claim 4, further comprising an intermediate bearing layer disposed between the outer layer and the inner layer, the inner layer being an overlay disposed radially inward of the intermediate bearing layer.

7. The engine of claim 6, wherein the intermediate bearing layer contacts both the outer layer and the overlay.

8. The engine of claim 4, wherein the inner layer comprises at least one of the following materials: copper, tin, aluminum, silicon, and a polymer, and wherein an outer side of the outer layer forms an outermost edge of the bearing shell, and wherein the outer layer is substantially comprised of at least one of the following aluminum alloys: 2014-T6, 7075-T6, 7090-T6, 7091-T6, 7054-T6, and 6066-T6.

* * * * *